United States Patent [19]

Kashiwagi et al.

[11] 4,395,169

[45] Jul. 26, 1983

[54] DRILL BIT

[75] Inventors: Takashi Kashiwagi; Hiroshi Kasutani, both of Gifu, Japan

[73] Assignee: Mitsubishi Kinzoku Kabushiki Kaisha, Tokyo, Japan

[21] Appl. No.: 163,264

[22] Filed: Jun. 26, 1980

[30] Foreign Application Priority Data

Jul. 4, 1979 [JP] Japan .............................. 54-92229[U]

[51] Int. Cl.³ .............................................. B23B 51/06
[52] U.S. Cl. .................................... 408/59; 408/144; 408/211; 408/705
[58] Field of Search ................. 408/59, 144, 205, 211, 408/224, 229, 705, 233

[56] References Cited

U.S. PATENT DOCUMENTS

| 1,513,350 | 10/1924 | Stolle | 408/705 X |
| 1,661,017 | 2/1928 | Stolle | 408/59 |
| 2,188,928 | 2/1940 | Stolle | 408/59 |
| 2,325,535 | 7/1943 | Nordberg | 408/59 |
| 2,847,885 | 8/1958 | Wagner | 408/59 |
| 3,304,815 | 2/1967 | Faber | 408/59 |
| 3,572,183 | 3/1971 | Mellone | 408/224 |

FOREIGN PATENT DOCUMENTS 41242  3/1980  Japan .
41276  3/1980  Japan .
41285  3/1980  Japan .

Primary Examiner—Z. R. Bilinsky
Attorney, Agent, or Firm—Cushman, Darby & Cushman

[57] ABSTRACT

A drill bit comprises a body of a cylindrical shape having a straight groove of a generally V-shape formed in the circumferential surface thereof and extending along the longitudinal axis thereof. The bit body has a drilling fluid passageway extending longitudinally therethrough. One of the two side faces defining the longitudinal groove has a radially inwardly-disposed convex surface of a semicylindrical shape and a flat surface extending radially outwardly from the semi-cylindrical surface of the periphery of the cylindrical bit body. The semi-cylindrical surface terminates at its forward end in an arcuate inward cutting edge while the flat surface terminates at its forward end in a straight outward cutting edge. The arcuate inward cutting edge is offset from the straight outward cutting edge when viewed from the forward end of the bit body.

11 Claims, 14 Drawing Figures

DRILL BIT

BACKGROUND OF THE INVENTION

1. Field of the Invention

This invention relates generally to drill bits and more particularly to gun drill bits suitable for creating a deep hole in a solid material.

2. Prior Art

Generally, for creating a deep hole in a solid material, there are employed drill bits of the type in which the bit body has a V-shaped straight groove extending longitudinally along the side thereof. One of the side faces defining the longitudinal groove terminates at its forward end in a cutting edge, and the bit body has a drilling fluid passageway extending longitudinally therethrough. A typical example of such drill bits is a gun drill bit.

FIGS. 1 and 2 show the forward end or head portion of one conventional gun drill bit, the drill bit comprising a cylindrical body 100 having a straight V-shaped groove 101 extending longitudinally along the side thereof. The bit body has a drilling fluid passageway 102 extending longitudinally therethrough. The longitudinal groove 101 serves to discharge cuttings from a drilled hole in a workpiece. The groove 101 is defined by a pair of radially disposed flat side faces 103, 104, the side face 103 acting as a rake surface and terminating at its forward end in a pair of continuous straight inward and outward cutting edges 105, 106. The cutting edges 105, 106 intersect each other at the apex 107 of the bit head and are sloping in a direction away from the bit head, the apex being offset one sixth to one third of the diameter of the cylindrical bit body from the central axis thereof. Thus, the inward and outward cutting edges 105, 106 are sloping in the opposite directions. As a result, during the drilling operation, the inward and outward cutting edges 105 and 106 produce one-piece cuttings, each cutting having alternate portions produced by the inward and outward cutting edges 105 and 106. Each cutting is deformed at the junctions of the alternate portions so that the alternate portions interfere with each other to thereby allow the cutting to be susceptible to division at the junctions of the alternate portions. This cutting is divided by impinging on the side face 104 or being subjected to the high pressure of the drilling fluid passing through the longitudinal groove 101. The thus divided cuttings are relatively long. The smaller the cuttings are divided, the more efficiently the drilling operation is carried out because the cuttings do not interfere with the cutting operation of the drill bit. This conventional drill bit has been found not entirely satisfactory in that the cuttings produced by the inward and outward cutting edges 105, 106 fail to be divided in pieces enough to permit the cutting operation to be carried out in an efficient manner. Usually, the maximum feed rate or cutting speed of this known drill bit is only 0.05 mm per revolution.

SUMMARY OF THE INVENTION

It is therefore an object of this invention to provide a drill bit capable of running at a high cutting speed or feed rate.

Another object is to provide such drill bit in which the cutting edge, when worn, can be ground to the proper angle with utmost ease.

According to the present invention, there is provided a drill bit which comprises a body of a cylindrical shape having a face at its forward end and a straight groove of a generally V-shape formed in the circumferential surface thereof and extending along the longitudinal axis of the bit body; the corner into which the two side faces defining the longitudinal groove merge being disposed in the vicinity of the longitudinal axis of the bit body; the bit body having a drilling fluid passageway extending longitudinally through the bit body and opening to the end face; one of the two side faces having a semi-cylindrical convex surface extending radially outwardly from the corner and a flat surface extending radially outwardly from the semi-cylindrical surface to the periphery of the cylindrical bit body; the semi-cylindrical surface and the flat surface extending along the longitudinal axis of the bit body; the semi-cylindrical surface terminating at its forward end in an arcuate inward cutting edge while the flat surface terminates at its forward end in a straight outward cutting edge; and the arcuate inward cutting edge being offset from the straight outward cutting edge when viewed from the forward end of the bit body.

During the drilling operation, the inward and outward cutting edges jointly produce one-piece cuttings, each cutting having alternate portions produced by the inward and outward cutting edges. That portion of each cutting produced by the inward arcuate cutting edge is spread out by the semi-cylindrical surface while that portion of the cutting produced by the outward cutting edge impinges on that portion of the semi-cylindrical surface adjacent to the outward flat surface. Further, the alternate portions of the cutting interfere with each other to thereby allow the cutting to be highly susceptible to division at the junctions of the alternate portions. The cuttings are divided in pieces by impinging on the other side face, which cooperates with the one side face to define the longitudinal groove.

Many other advantages and features of the present invention will become manifest to those versed in the art upon making reference to the detailed description and the accompanying sheets of drawings in which preferred structural embodiments incorporating the principles of the present invention are shown by way of example.

DESCRIPTION OF THE PREFERRED EMBODIMENTS OF THE INVENTION

Figure 1:
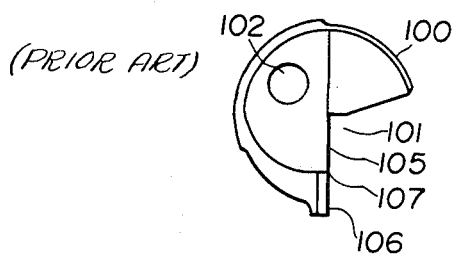
FIG. 1 is a forward end view of a drill bit provided in accordance with the prior art.
Figure 2:
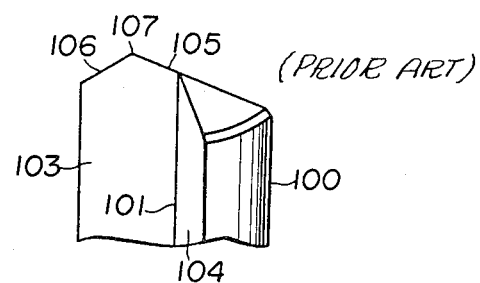
FIG. 2 is a side elevational view of the forward end portion of the drill bit.
Figure 3:
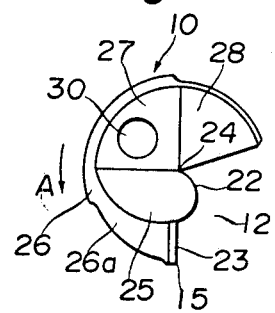
FIG. 3 is a forward end view of a drill bit provided in accordance with the present invention.
Figure 4:
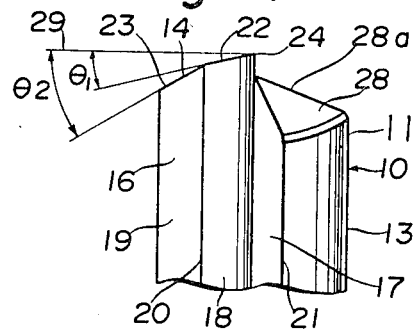
FIG. 4 is a side elevational view of the forward end portion of the drill bit of FIG. 3.

FIGS. 3 and 4 show a head or forward end portion of a gun drill bit 10, the drill bit being adapted to be attached to a drill rod for forming a deep hole in a solid material. The drill bit 10 comprises a solid body 11 of a cylindrical shape with a generally V-shaped straight groove 12 formed in the circumferential surface thereof and extending along the longitudinal axis thereof.

The bit body 11 includes a straight shank 13 and a blade portion 14 formed at the forward end of the shank. The drill bit 10 is rotated in a counterclockwise direction as indicated by an arrow A (FIG. 3), when viewed from the forward end of the drill bit, so as to effect the drilling operation. The leading edge 15 of the generally V-shaped groove 12 serves as a cutting edge of the drill bit. This longitudinal groove 12 serves to discharge cuttings or chippings from a drilled hole in a workpiece.

The generally V-shaped groove 12 is defined by a pair of first and second side faces 16, 17 extending along the longitudinal axis of the bit body 11, the second side face being made flat. The first side face 16 is defined by an inwardly disposed convex surface 18 of a semi-cylindrical shape and a flat surface 19 extending radially outwardly from the semi-cylindrical surface to the periphery of the bit body, the semi-cylindrical surface 18 and the flat surface 19 extending along the longitudinal axis of the bit body 11. The angle between the flat side face 17 and the flat surface 19 is obtuse and preferably between 110° to 120°. There is provided a corner 20 in which the semi-cylindrical surface 18 and the flat surface 19 merge, the corner being disposed approximately centrally of the width of the first side face 16, as best shown in FIG. 4. The corner 21 into which the flat second side face 17 and the semi-cylindrical surface 18 merge is disposed on the central or longitudinal axis of the bit body 11 which serves as an axis of rotation thereof. The radially outwardly disposed flat surface 19 lies in a plane passing through the longitudinal axis of the bit body 11.

With this configuration, the bit body 11 has a uniform cross-sectional shape throughout the length thereof. The first side face 16, having the inward semi-cylindrical surface 18 and the outward flat surface 19, terminates at its forward end in the above-mentioned leading edge 15, the semi-cylindrical and flat surfaces 18, 19 terminating in an arcuate inward cutting edge 22 and a straight outward cutting edge 23, respectively. As will be appreciated, the inner end of the arcuate inward cutting edge 22 lies on the central axis of the bit body 11 while the outer end is radially spaced from the central axis approximately half the radius of the cylindrical bit body 11. Preferably, the inward cutting edge 22 has the contour of part of the circumference of a circle. The apex 24 of the bit head is disposed on the central axis of the bit body 11. The straight outward cutting edge 23 extends radially outwardly from the outer end of the arcuate inward cutting edge 22 to the periphery of the bit body 11. As will be appreciated, the arcuate inward cutting edge 22 intersects the straight outward cutting edge 23 at the corner 21.

As shown in FIG. 3, the forward end face of the bit body 11 has four major surfaces 25, 26, 27, 28. The flat surface 25 cooperates with the semi-cylindrical surface 18 to define the inward cutting edge 22, the flat surface 25 serving as a clearance surface. The flat major portion 26a of the end surface 26 extends radially outward from the end surface 25 and coacts with the outward side surface 19 to define the outward cutting edge 23, the end surface 26 being chamfered immediately adjacent to the flat surface 19. The end surface 26 defines the peripheral margine of the end face. The major portion 26a serves as a clearance surface. The inner end of the edge 28a of the end surface 28 is disposed adjacent to the apex 24 so that the inward cutting edge 22 is disposed in stepped relation to the edge 28 when viewed from the side of the bit body 11, as shown in FIG. 4.

As shown in FIG. 4, the end surface 25 and the major portion 26a of the end surface 26 are sloping radially outwardly in a direction away from the bit head to provide respectively an angle $\theta_1$ between the inward cutting edge 22 and a transverse plane 29 perpendicular to the longitudinal axis of the bit body 11 and an angle $\theta_2$ between the outward cutting edge 23 and the transverse plane 29. The angle $\theta_2$ is greater than the angle $\theta_1$.

A passageway 30 extends longitudinally through the bit body 11 and opens to the end surface 27 for feeding a drilling fluid under high pressure to that part of the workpiece being drilled so as to sweep the cuttings from the created hole through the longitudinal groove 12 and to lubricate and cool the dril bit 10.

In operation, the drill bit 10 is driven for rotation in the direction indicated by the arrow A about the central axis thereof so that the inward arcuate cutting edge 22 and the outward straight cutting edge 23 jointly produce one-piece or continuous cuttings or chippings from the workpiece to form a hole therein, each cutting having alternate portions produced by the inward and outward cutting edges. During the drilling operation, that portion of the cutting produced by the arcuate inward cutting edge 22 is forced to be spread out radially by the semi-cylindrical surface 18 while that portion of the cutting produced by the straight outward cutting edge 23 impinges on that portion of the semi-cylindrical surface 18 disposed adjacent to the flat outward side surface 19. Further, the alternate portions of the cutting interfere with each other to thereby allow the cutting to be hightly susceptible to division or separation particularly at the junctions of the alternate portions. The cuttings are divided in pieces by impinging on the side face 17. The thus divided cuttings are sufficiently divided in small pieces to be smoothly discharged from the hole in the workpiece through the longitudinal groove 12 by the drilling fluid supplied through the passageway 30. This ensures a high cutting speed of the drill bit 10.

The arcuate inward cutting edge 22 is disposed radially inwardly relative to the outward cutting edge 23, and the peripheral speed and hence the cutting speed of the inward cutting edge 22 is lower than that of the outward cutting edge 23. This ensures that no cutout or chipping develop on the cutting edges even if the edge portion of the drill bit 10 is made of a super hard alloy. Where it is desired to provide a hole of relatively large diameter in the workpiece, a blade member made of a super hard alloy is attached to the bit body 11 of steel by brazing or suitable fastening means such as screws. As mentioned above, the semi-cylindrical surface 18 and the flat side surface 19 which act as rake surfaces extend along the longitudinal axis of the drill bit body 11. When the cutting edges 22, 23 are worn, it is only necessary to grind the end surface 25 and the major portion 26a of the end surface 26 to the proper angles to provide the keen cutting edges 22, 23. Thus, the grinding operation can be carried out with utmost ease.

Figure 5:
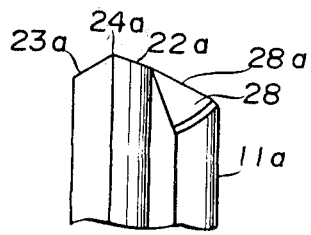
FIGS. 5 to 12 are views similar to FIG. 4 but showing modified drill bits, respectively.

According to a modified form of the invention as shown in FIG. 5, an arcuate inward cutting edge 22a is sloping radially inwardly in a direction away from the forward end of the bit body 11a, the inward cutting edge 22a intersecting a straight outward cutting edge 23a at an apex 24a of the bit end. The inward cutting edge 22a intersects the edge 28a of the end surface 28. The apex 24a is offset one eighth to one fourth of the diameter of the bit body from the central axis thereof. The angle between the outward cutting edge 23a and the transverse plane perpendicular to the longitudinal axis of the bit body is 30° while the angle between the inward cutting edge 22a and the transverse plane is 5°. With this modified drill bit, its straightness during the drilling operation is enhanced.

Figure 6:
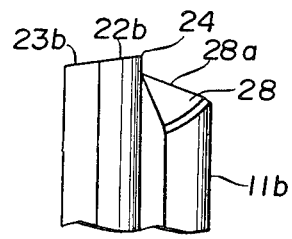

FIG. 6 shows another modification of the invention in which the angle between an arcuate inward cutting edge 22b and the transverse plane perpendicular to the longitudinal axis of the bit body 11b is equal to the angle between a straight outward cutting edge 23b. In other words, the inward and outward cutting edges lie in a common plane. The inward and outward cutting edges are sloping radially outwardly in a direction away from the forward end of the bit body. The inner end of the edge 28a of the end surface 28 is disposed adjacent to the apex 24. This modified drill bit facilitates the grinding of the inward and outward cutting edges to the proper angles.

Figure 7:
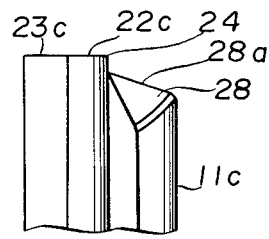

FIG. 7 shows a further modification of the invention in which an arcuate inward cutting edge 22c and a straight outward cutting edge 23c lies in a common transverse plane perpendicular to the longitudinal axis of the bit body 11c. The inner end of the edge 28a of the end surface 28 is disposed adjacent to the apex 24. This modified drill bit is best suited for forming a hole with a flat bottom in a not too hard material such as aluminum, copper, and an aluminum alloy.

Figure 8:
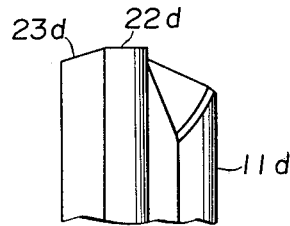

A still further modified drill bit shown in FIG. 8 differs from the drill bit shown in FIG. 7 only in that a straight outward cutting edge 23d is sloping radially outwardly in a direction away from the forward end of the drill bit 11d. An inward cutting edge 22d lies in a transverse plane perpendicular to the longitudinal axis of the bit body.

Figure 9:
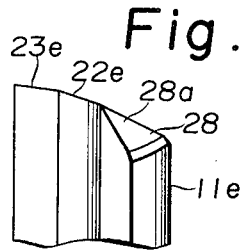

FIG. 9 shows a further modified drill bit 11e in which a straight outward cutting edge 23e and an arcuate outward cutting edge 22e are sloping radially inwardly in a direction away from the forward end of the drill bit 11e. The inward cutting edge 22e intersects the edge 28a of the end surface 28.

Figure 10:
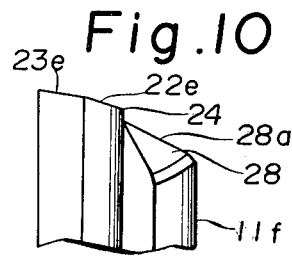

A further modified drill bit 11f shown in FIG. 10 differs from the drill bit 11e shown in FIG. 9 only in that the inner end of the edge 28a of the end surface 28 is disposed adjacent to the apex 24.

Figure 11:
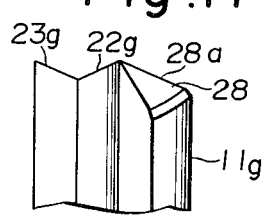

FIG. 11 shows a further modified drill bit 11g in which an arcuate inward cutting edge 22g and a straight outward cutting edge 23g are sloping radially outwardly and inwardly, respectively, in a direction away from the forward end of the drill bit 11g. The inward cutting edge 22g intersects the edge 28a of the end surface 28.

Figure 12:
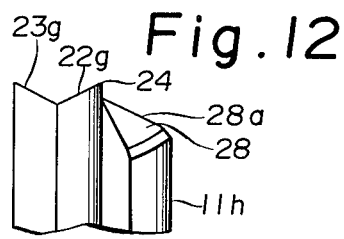

A further modified drill bit 11h shown in FIG. 12 differs from the drill bit 11g shown in FIG. 11 only in that the inner end of the edge 28a of the end surface 28 is disposed adjacent to the apex 24.

Figure 13:
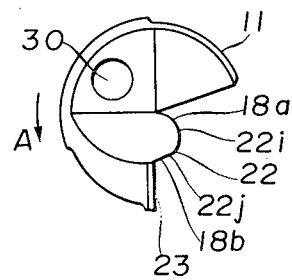
FIGS. 13 and 14 are views similar to FIG. 3 but showing further modified drill bits, respectively.

According to a further modified form of the invention as shown in FIG. 13, the semi-cylindrical surface 18 is replaced by a surface having a radially inwardly disposed first surface 18a of semi-cylindrical shape and a radially outwardly disposed flat second surface 18b extending from the first surface 18a. With this configuration, an inward cutting edge 22 has an arcuate portion 22i and a straight portion 22j.

Figure 14:
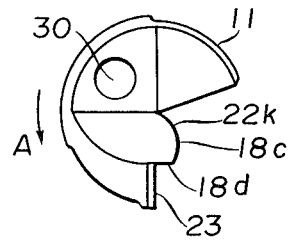

FIG. 14 shows a further modification of the invention in which the semi-cylindrical surface 18 is replaced by a surface having a radially inwardly disposed first surface 18c of a semi-cylindrical shape and a flat second surface 18d extending from the first surface 18c, the flat second surface 18d substantially perpendicularly intersecting the outward flat side surface 19. An arcuate edge 22k serves as an inward cutting edge.

The drill bits shown in FIGS. 5 to 14 can operate to divide the cuttings, produced by the inward and outward cutting edges, into pieces in the manner similar to that described above for the drill bit 10 as shown in FIGS. 3 and 4.

With the unique configuration of the drill bit, the inward and outward cutting edges produce continuous cuttings. During the drilling operation, that portion of each cutting produced by the inward cutting edge is spread out by the semi-cylindrical surface 18 while that portion of the cutting produced by the outward cutting edge impinges on that portion of the semi-cylindrical surface adjacent to the flat outward side surface 19. Further, the alternate portions of the cutting interfere with each to thereby allow the cutting to be highly susceptible to division or separation at the junctions of the alternate portion. The cuttings are finally divided into relatively small pieces by impinging on the side face 17.

The division of the cuttings into pieces facilitates the removal of the cuttings from the drilled hole through the longitudinal groove 12. Thus, the cuttings do not interfere with the drilling operation.

While the drill bits according to the invention have been specifically shown and described herein, the invention itself is not to be restricted by the exact showing of the drawings or the description thereof. Further, the apex of the drill head may be disposed in the vicinity of the central axis of the cylindrical bit body 11. For example, the apex 24 is offset 0.1–0.15 mm radially outwardly from the central axis of the bit body.

What is claimed is:

1. A drill bit comprising:
a body of a cylindrical shape having a face at its forward end and a straight groove of a generally V-shape including two side faces and a corner into which said faces merge;
said groove being formed in the circumferential surface thereof and extending along the longitudinal axis of the bit body;
said corner being disposed in the vicinity of the longitudinal axis of said bit body;
said bit body having a drilling fluid passageway extending longitudinally through said bit body and opening to said end face;
one of said two side faces having semi-cylindrical convex surface extending radially outwardly from said corner and a flat surface extending radially outwardly from said semi-cylindrical surface to the periphery of said cylindrical bit body;
said semi-cylindrical surface and said flat surface extending along the longitudinal axis of said bit body;
said semi-cylindrical surface terminating at its forward end in an arcuate inward cutting edge while said flat surface terminates at its forward end in a straight outward cutting edge;
said arcuate inward cutting edge and said straight outward cutting edge sloping radially outwardly in a direction away from said forward end of said drill bit body;
said forward end of said drill bit having an apex in the vicinity of said longitudinal axis, and the inner end of said arcuate inward cutting edge being disposed at said apex of said forward end; and said arcuate inward cutting edge being offset from said straight outward cutting edge when viewed from the forward end of said bit body.

2. A drill bit according to claim 1, in which the angle between said outward cutting edge and a transverse plane perpendicular to the longitudinal axis of said bit body is greater than the angle between said inward cutting edge and said transverse plane.

3. A drill bit according to claim 1, in which the angle between said outward cutting edge and a transverse plane perpendicular to the longitudinal axis of said bit body is equal to the angle between said inward cutting edge and said transverse plane.

4. A drill bit according to claim 1 in which the end surface of said bit forward end adjacent to the other side face which cooperates with the one side face to define said longitudinal groove is disposed in a direction away from said forward end in stepped relation to said inward cutting edge.

5. A drill bit according to claim 1, in which the corner into which said arcuate inward cutting edge and said straight outward cutting edge merge is offset radially approximately half the radius of said cylindrical bit body from the longitudinal axis thereof.

6. A drill bit according to claim 1, in which said bit body has a uniform cross-section throughout the length thereof.

7. A drill bit according to claim 1, in which the edge portion of said bit body including said inward and outward cutting edges is made of a super hard alloy.

8. A drill bit according to claim 1, in which said arcuate inward cutting edge has the contour of part of the circumference of a circle.

9. A drill bit according to claim 1, in which said semi-cylindrical surface has a flat side surface immediately adjacent to said first-mentioned flat surface, said flat side surface extending along the longitudinal axis of said bit body.

10. A drill bit according to claim 6, in which said flat side surface intersects said flat surface perpendicularly.

11. A drill bit according to claim 1, in which the angle between said flat surface and the other side face, which cooperates with the one side face to define said longitudinal groove, is obtuse.

* * * * *